Nov. 11, 1941.   H. CAMINEZ   2,262,450
SELF-LOCKING NUT
Filed July 19, 1939
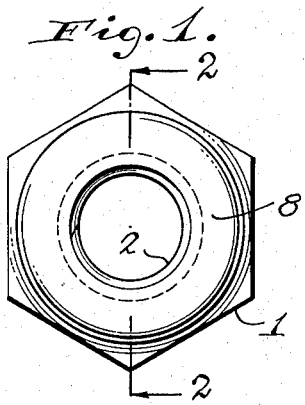
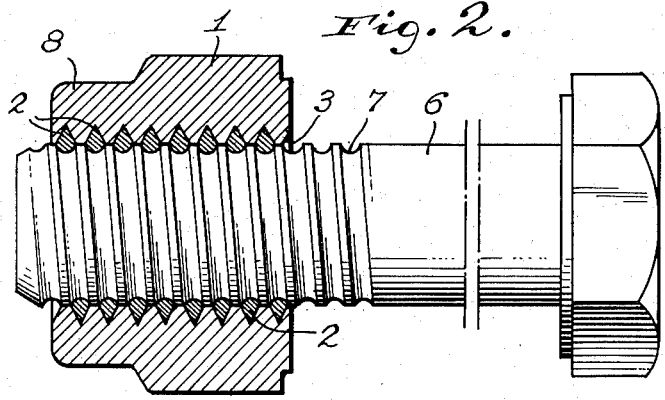
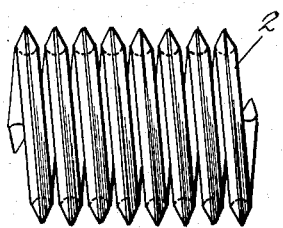
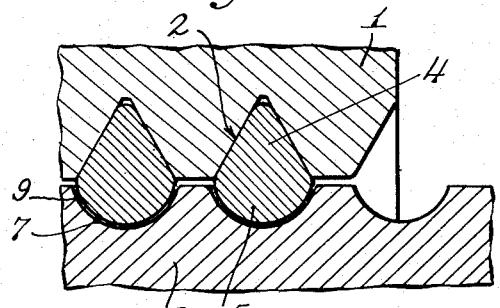
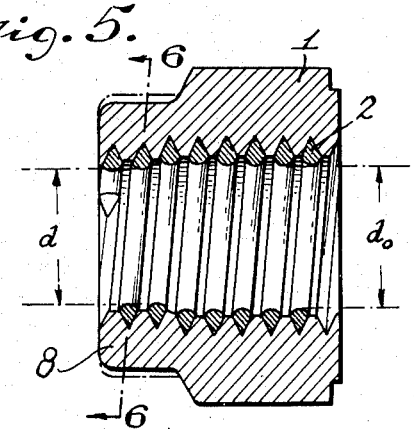
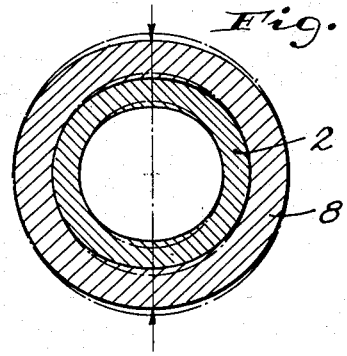
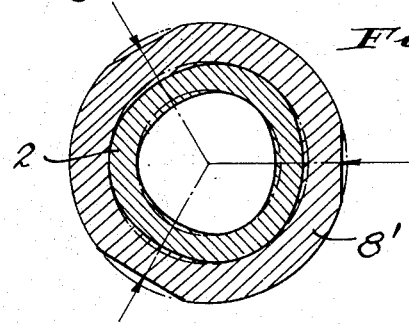
INVENTOR.
HAROLD CAMINEZ
BY Walter S. Oleston
ATTORNEY Patented Nov. 11, 1941

2,262,450

UNITED STATES PATENT OFFICE 2,262,450

SELF-LOCKING NUT

Harold Caminez, Kew Gardens, N. Y., assignor to Aircraft Screw Products Company, Inc., Long Island City, N. Y., a corporation of New York Application July 19, 1939, Serial No. 285,224

3 Claims. (Cl. 151—21)

The present invention relates to a screw thread system suitable for high strength bolts and nuts and more particularly to a self-locking nut having a thread insert of the type described in my Patents Nos. 2,150,875, 2,150,876, and 2,152,681.

My researches and investigations have shown that a shallow circular section thread groove when used on a bolt, produces a bolt of much higher tensile strength and appreciably greater shock resistance and fatigue capacity than it is possible to obtain with angular section thread grooves as now generally employed. The shallow circular section thread groove, however, has only a limited bearing area on each thread surface which requires that a sufficient length of thread engagement be employed, so that sufficient threads are in engagement. In order for the nut to engage properly, it is also necessary to provide in its design some means for compensating for minor pitch irregularities. In order to insure that the nut can be pulled up tightly so that the threads will not pick up or seize under load, it is necessary that the mating thread in the nut have a smooth, polished, hard metal thread surface. This surface must also be able to support a high unit bearing load and under these high loads it must have good antifrictional qualities with respect to the bolt thread. The thread in the nut must have sufficient ductility to allow it to conform to slight inaccuracies of the mating bolt thread and must also have sufficient resilience to provide for the distribution of the load to the various threads in contact.

The above characteristics of the nut thread are obtained by tapping the hole in the body of the nut with a V-shaped thread and assembling in this tapped hole a special shaped spring wire thread insert which expands against these thread grooves and forms a hard metal thread lining that virtually becomes an integral part of the nut thread. In order for the nut to have the self-locking characteristics which I have found desirable for service use, part of the nut body with the insert therein is slightly deformed, whereby a radial force is exercised by the nut on a screw when engaged by it, such radial force creating sufficient friction to counteract the effect of vibration forces normally experienced in service which tend to loosen the nut.

This new screw thread system is particularly effective for alloy steel bolts. The complete elimination of all sharp corners in the thread allows these bolts to be heat-treated to high values of tensile strength. This heat-treatment can be accomplished after threading since this thread form produces negligible heat-treating strains in the threads. With these bolts, a nut made of free cutting machine steel can be employed using a thread insert of spring tempered phosphor bronze wire, this wire furnishing the necessary strength characteristics to the thread surface of the free machining nut material. This bolt and nut combination not only has considerably higher strength than alloy steel bolts using present standard threads, but the bronze spring wire in the nut prevents the bolt and nut from seizing under load or from rusting together in service.

I find this screw system also highly advantageous for aluminum alloy bolts and nuts, for stainless steel bolts and nuts, and for bolts and nuts made of other special materials such as Monel metal or special bronze or whenever it is desired to obtain maximum strength and to prevent any tendency to seize together in service. In this screw system, by the proper selection of the spring wire metal used in the thread insert, it is possible to eliminate entirely any seizure or welding together between the bolt and the nut. I find that bronze spring wire is suitable for the majority of applications, although for certain conditions where special corrosion problems exist, I find that stainless steel wire is most suitable particularly for aluminum alloy bolts and nuts, and that special high nickel alloy wire is most suitable for stainless steel bolts and nuts.

Thus, my invention consists in a nut body and a wire coil insert engaging the thread of the nut body, wherein at least part of the nut body with the insert therein is slightly deformed by compression. Thereby, a radial force is exercised by the nut on a screw engaged by such nut, said radial force creating sufficient friction to counteract the effect of normally occurring forces which tend to loosen the nut.

Further objects and details of the invention will be apparent from the description hereinafter and the accompanying drawing showing an embodiment thereof by way of example.

In the drawing:

Fig. 1 is a rear end view of a nut according to the invention prior to its deformation, Fig. 2 is a cross-section thereof along line 2—2 of Fig. 1, applied to a bolt, Fig. 3 is an elevation of a coil insert, Fig. 4 is a cross-section of a portion of the coil wire and adjacent parts on a larger scale.

Fig. 5 is a cross-section of the nut similar to Fig. 2 in which, however, the nut is deformed, Fig. 6 is a diagrammatical cross-section along line 6—6 of Fig. 5, Fig. 7 is a cross-section similar to Fig. 6 of a modification, the nut being deformed by compression from three outside points.

Referring now to the drawing, the nut according to the invention consists of two parts, viz. the nut body 1 and the insert 2. The nut body 1 may be of any suitable shape, for instance six-sided as shown in Fig. 1. It is provided with an interior V-shaped thread groove 3. The insert 2 consists of a coil of resilient spring wire which is wound so that it exerts a radial pressure against the thread groove 3 with which it engages. In the illustrated embodiment, the cross-section of the wire shown in Fig. 3, has an outer portion 4, adapted to wedge in the thread groove of the nut body, owing to its tendency to expand, that means to return to its original shape. Said outer portion of the cross-section has substantially the shape of a truncated triangle the sides of which include an angle of a size equal to that of the thread groove walls. In virtue of this feature, the wire coil will forcibly bear against the last mentioned walls, and the wedging action has for a result that the coil cannot be shifted with respect to the nut body once it is inserted, except by the application of particular means. The inner portion 5 of the wire cross-section has a rounded or segment-like shape for use with a male member 6 provided with an accordingly shaped shallow, round bottom thread groove 7. A slight clearance 9 may be provided in order to allow for an originally running fit of the nut. This thread groove form provides a screw with markedly greater static and dynamic strength when compared with screws having a conventional V-form of the thread groove. However, the shallow, round groove has limited bearing area and requires that the mating thread in the female member should have a smooth, polished, hard metal thread surface of good bearing characteristics and good anti-frictional qualities. The female mating thread must also have sufficient ductility to conform to any thread inaccuracies on the mating screw. These particular properties for the thread of the female member are obtained in the nut according to the invention by use of thread insert 2 which is screwed into the tapped hole of the nut. Since the main body of the nut does not bear directly against the screw, this member may be made of a suitable free machining material without affecting the mating qualities of the screw and nut.

When a nut is screwed up tightly, considerable force is created in the screw, and due to the frictional forces, set up, the nut will not loosen in service while this axial force exists. However, due to the yield of the parts bolted together, or due to wear of the surfaces or to yield of the screw material this axial force may gradually diminish so that sufficient pressure against the face of the nut and the thread no longer exists to keep the nut from working loose under usual vibration loads.

In order to prevent this drawback, I provide the nut shown in Figs. 1 and 2 with a self-locking feature according to the invention by swedging at least a portion of the nut body 1, preferably its rear end 8, out of its original shape after the insert 2 has been screwed into place. In order to facilitate the swedging operation and, furthermore, to limit the swedged portion to a pre-determined length, the rear end 8 of the nut body may be offset with respect to the main nut body portion preferably so as to form a round collar of a reduced diameter. The swedging or compression force may be applied to the collar 8 from two opposite sides whereby the originally circular cross-section of said collar is so deformed as to take an approximately elliptical shape indicated by Figs. 5 and 6. Or, compression may be applied from more than two outside points, for instance from three points equidistanced from each other, whereby a deformation of the collar is attained as illustrated at 8' in Fig. 7. In any event, the collar or rear end is sufficiently deformed so that the base or inner portion of the insert wire within said deformed portion of the nut body will bear against the root of the thread groove in the screw to hold the nut snugly in place and to prevent it from working loose in service. This is clearly shown in Fig. 5, where the distance $d$ is smaller than $d_0$. It is obvious, however, that the conditions are very materially exaggerated in Fig. 5, merely for sake of better understanding, and that I do not intend to recommend the application of specific or relative dimensions which might be taken from the drawing.

The self-locking nut hereinbefore described provides a snug, tight fit against the base of the thread of the male member 6. When the nut is tightened, the load forces exercise pressure against the side of the thread rather than against the base so that screwing the nut tight does not tend to wear the screw or nut thread at the base where the self-locking connection maintains a tight fit as stated above. This is one of the reasons why I prefer the use of an insert substantially of a cross-section as shown in Fig. 4, suggesting a male thread member with a shallow round bottom thread groove, to a nut swedged in the described manner, and embodying V-shaped thread convolutions for engagement with an accordingly threaded male member. It is obvious that in a connection of the last mentioned type less favorable conditions will prevail than in the nut comprising an insert with a wire cross-section having an outer wedging portion and an inner segment-shaped portion, according to the invention.

In a self-locking nut construction of conventional type, the tight fit of the nut on the screw frequently causes the parts to seize or rust together which prevents the nut later from being pulled tighter or from being removed. It is a particular feature of the self-locking nut according to the present invention that a suitable material can be chosen for the thread insert which will prevent such seizing or rusting together without interfering with other desirable qualities of the nut proper in view of which the material of the nut body is selected. Thus, care can be taken that the nut while being self-locking can always be pulled tighter in service when this is required, and can also be removed and re-used without danger of spoiling the thread of the screw. I have found that a bronze wire insert is most suitable when the nut is used on a steel screw, and that a stainless steel insert is desirable when the nut is used on an aluminum alloy screw.

As to the pressure applied in order to obtain the desired deformation of the rear end of the nut body, I wish to point out that I prefer to so choose the wall thickness of the nut body portion to be deformed, and its elastic characteristics that the deformation of the nut body is permanent while the deformation of the wire insert is still within its elastic limits. Owing to the fact that the actual deformation is comparatively very small, the force exerted by a male member screwed into the nut, and tending to restore the insert and the nut body to their original non-deformed shape, will excite such an elastic counterforce in the nut body as required to provide the desired self-locking feature. On the other hand, the elastic characteristics of the nut are preferably such that a reasonable variation in the size of the mating screw thread will not unduly affect the pressure required to screw the nut on and off.

In other words, I found it advisable to deform the nut, and more particularly the nut body, an amount several times the radial clearance between the bolt and nut thread. The thickness of the nut body portion to be deformed, as well as the yield strength and the elastic characteristics of the nut body material, determine the maximum radial force and therefore the maximum friction that the deformation of this part of the nut will create between the bolt and nut threads. It is desired that this friction be sufficient to hold the nut in place under the most severe conditions experienced in service, but it should not be so great as to require excessive pressure to install or remove the nut. I have found from experience that a suitable initial deformation is about two to five times the maximum radial clearance that the manufacturing limits allow between the wire assembled in the nut and the root diameter of the thread on the screw. However, in cases other than those to which the foregoing statement relates, other values concerning the deformation may be found adequate.

It will be apparent to those skilled in the art that many variations and modifications of the structure above described and illustrated can be made without departing from the spirit and scope of the present invention. Thus, it is immaterial for instance whether or not the original external shape of the nut is such as shown in Fig. 2, or whether the required deformation is obtained in the manner described or in any other suitable manner. Furthermore, I desire it to be understood that, although I have shown only the preferred form of the cross-sections of the nut thread and of the insert wire, other suitable cross-sections may be applied in order to produce a self-locking nut according to my invention defined in the appended claims.

I claim:
1. A self-locking nut comprising a metal nut body with a thread groove therein and a spring wire coil insert having the tendency to expand, said insert being in engagement with said thread groove and projecting therefrom so as to constitute thread convolutions for a male threaded member, said nut body with the coil insert therein being deformed over at least part of their length by lateral compression prior to the application of the nut to said male member, the deformation of the nut body being a permanent one, and the deformation of the insert being within the elastic limits of the wire material.

2. A self-locking nut comprising a metal nut body with a V-shaped thread groove and a wire coil insert, the coil wire having a cross-section with an outer portion adapted to wedge in the thread groove of the nut body and a segment-shaped inner portion adapted to form a threading for engagement with a mating male screw member, said coil being held in engagement with the thread of said nut by its springing action, said nut body with the coil insert therein being deformed over at least part of their length by lateral compression prior to the application of the nut to said male member, the deformation of the nut body being a permanent one, and the deformation of the insert being within the elastic limits of the wire material.

3. A self-locking nut comprising a metal nut body having a rear end portion offset with respect to the main portion of the nut body, and a wire coil insert the coil wire having a cross-section with an outer portion adapted to wedge in the thread groove of the nut body and a segment-shaped inner portion adapted to form a threading for engagement with a mating male screw member, said coil being held in engagement with the thread of said nut by its springing action, said rear end portion with a portion of said insert therein being deformed by compression from three outside points substantially equidistanced from each other prior to the application of the nut to said male member, the deformation of said rear end portion of said nut body being a permanent one, and the deformation of said portion of the insert being within the elastic limits of the wire material.

HAROLD CAMINEZ.